United States Patent [19]

Parrott et al.

[11] 4,447,555

[45] May 8, 1984

[54] HYDROCRACKING CATALYSTS

[75] Inventors: Stephen L. Parrott; John W. Myers, both of Bartlesville, Okla.

[73] Assignee: Phillips Petroleum Company, Bartlesville, Okla.

[21] Appl. No.: 481,957

[22] Filed: Apr. 4, 1983

Related U.S. Application Data

[63] Continuation of Ser. No. 291,662, Aug. 10, 1981, abandoned.

[51] Int. Cl.$^3$ ........................ B01J 29/06; B01J 29/16
[52] U.S. Cl. .......................................... 502/74; 502/66
[58] Field of Search ........................ 252/455 Z, 469; 208/111; 502/74, 66

[56] References Cited

U.S. PATENT DOCUMENTS

| | | | |
|---|---|---|---|
| 2,605,238 | 7/1952 | Krantz | 252/469 |
| 2,687,370 | 8/1954 | Hendricks | 252/469 X |
| 3,620,964 | 11/1971 | Stover | 208/111 |
| 3,677,971 | 7/1972 | White | 252/455 R |
| 3,840,473 | 10/1974 | Beuther et al. | 252/469 X |
| 3,928,233 | 12/1975 | Young | 252/455 Z |
| 3,953,364 | 4/1976 | Jaffe | 252/455 Z |
| 3,963,644 | 6/1976 | Hansford | 252/455 Z |
| 4,333,855 | 6/1982 | Gardner et al. | 208/216 R |

*Primary Examiner*—Carl F. Dees

[57] ABSTRACT

The activity and deactivation rate of hydrocracking catalysts are improved by making them via a particular production sequence.

36 Claims, No Drawings

HYDROCRACKING CATALYSTS

This is a continuation of application, Ser. No. 291,662, filed Aug. 10, 1981 and now abandoned.

THE INVENTION

This invention discloses a process for hydrocracking hydrocarbons which uses a novel hydrocracking catalyst. Hydrocracking catalysts are bifunctional, containing acidic components to catalyze cracking and metal components to catalyze reactions such as olefin hydrogenation, hydrodesulfurization, and hydrodenitrogenation. The novelty of this invention lies in the metal (hydrogenating) component of the hydrocracking catalyst and its method of preparation.

It has been found that, when using a Group IVB metal oxide as the base for the metal components—i.e., as the support component to be subsequently combined with other metal components—the order of addition of Group VIB and Group VIII components to the support affects significantly the activity and the rate of deactivation of the catalyst. That is, the addition of a Group VIII element, e.g., nickel, to the Group IVB metal oxide, e.g., titanium dioxide, before the addition of a Group VIB element, e.g., molybdenum, produces a hydrocracking catalyst that has higher activity and a slower rate of deactivation than the catalyst produced when the order of addition of the elements is reversed. At times, it is desirable to add hydrogenating metals to both the acidic component and the metal component.

In a preferred embodiment, a hydrocracking catalyst is prepared by admixing nickel and molybdenum oxides on titanium dioxide with low sodium type Y zeolite. An improvement is realized by impregnating the nickel into the titania and calcining prior to the addition and calcining of the molybdenum compound. The resultant catalyst exhibits higher activity and a slower rate of deactivation than preparations in which the order of metals addition is reversed.

OBJECTS OF THE INVENTION

It is an object of the invention to prepare hydrocracking catalysts having improved activities.

It is another object of the invention to prepare hydrocracking catalysts having slow rates of deactivation.

It is still another object of the invention to produce hydrocracking catalysts having superior activity and deactivation rates by employing a specific production sequence.

CATALYST PREPARATION

Any form of finely divided Group IVB metal oxide, preferably rutile or anatase titanium dioxide, is suitable for use in preparing the metal-containing component of the hydrocracking catalyst. The metal oxide is treated first with a solution containing a suitable compound of a Group VIII metal, preferably nickel and/or cobalt. Solvent is removed by conventional means, e.g., by evaporation and the resulting product is calcined under suitable conditions, e.g., by heating in air at about 475° to 700° C., for about 1 to 24 hours using longer times at lower temperatures and vice versa. Heating to 540°–600° C. for about 2 hours is preferred.

After cooling, the composition is treated with a solution containing a suitable compound containing at least one Group VIB metal. Preferred metals include molybdenum and tungsten. More solvent can be removed by evaporation and the resulting product calcined under suitable conditions, e.g. by heating in air at temperatures between about 475° and 700° C., preferably about 540° C., for about 1 to 24 hours, preferably about 2 hours. Optionally, this drying and/or calcining step can be omitted.

This composition is preferably combined with an acidic catalytic cracking component by conventional methods, e.g., by mixing the solids dry or in the presence of a liquid. The resultant composition is again calcined in air at temperatures between about 475° and 700° C., preferably about 540°–600° C., for about 1 to 24 hours, with about 2 hours preferred.

While any Group VIII metal-containing substance can be used, those containing nickel and/or cobalt are preferred. Nickel compounds suitable for use as a component of the catalyst include nickel nitrate and nickel acetate. Similarly, cobalt compounds that are suitable for use include cobalt nitrate and cobalt acetate.

While useful Group VIB metal-containing substances include a wide variety of substances, molybdenum and tungsten compounds are preferred. Molybdenum compounds that are suitable for use include normal ammonium molybdate [$(NH_4)_2MoO_4$] and ammonium heptamolybdate [$(NH_4)_6Mo_7O_{24}\cdot 4H_2O$]. Tungsten compounds that are suitable for use include ammonium metatungstate and ammonium paratungstate.

Various solvents and solvent combinations for the above-named compounds can be used. Water is preferred because of its convenience, economy and safety. Other useful solvents include ketones such as acetone.

The use of a particular acidic component in the hydrocracking catalyst is not a requirement of the instant invention. A suitable acidic component contains one or more of any of the substances that are known to be useful components of catalytic cracking catalysts. These include amorphous compositions such as silica-magnesia and silica-alumina; and crystalline compositions such as the rare earth or hydrogen forms of X and Y zeolites, erionite, and mordenite. Mixtures of any of the above compositions can be used.

The composition of the finished hydrocracking catalyst is usually similar to conventional multifunctional catalysts. That is, the catalyst contains suitable amounts of agents which assist in the chemical operations to be performed. The following tabulation shows several preferred agents and approximate amounts in which they can be used.

|  | Broad Range | Preferred Range |
| --- | --- | --- |
| Acidic component, e.g., zeolite | about 10–90 wt. % | about 25–75 wt. % |
| Group VIII metal-containing substance, e.g., Ni and/or Co (as the elements) | about 0.5–15 wt. % | about 1–10 wt. % |
| Group VIB metal-containing substance, e.g., Mo and/or W (as the elements) | about 1–35 wt. % | about 2–30 wt. % |
| Group IVB metal oxide, e.g. $TiO_2$ | about 10–80 wt. % | about 25–75 wt. % |

The physical form of the finished hydrocracking catalyst can be any that is suitable for the process in which it will be used. Useful forms include extrudates, tablets, and spray-dried powders.

The inventive catalyst can be used in hydrocracking processes for treating various feeds to make gasoline and distillates from heavier feedstocks, such as, for example, atmospheric and vacuum gas oils and topped crudes.

HYDROCRACKING CONDITIONS

The conditions under which hydrocracking occurs include those which permit both molecular decomposition and hydrogenation of organic species present. Since the decomposition is catalytic, elevated temperatures are employed. Normally, temperatures will lie between about 260° and 455° C., with about 315° to 425° C. preferred. The total pressure employed will lie between about 2.9–35 MPa, preferably between about 5.6–17 MPa. The hydrocarbon feed rate, expressed as volumes of liquid feedstock per volume of catalyst per hour (LHSV), can range between about 0.5 and 10 hr$^{-1}$, preferably between about 1 and 5 hr.$^{-1}$. The quantity of hydrogen that is added to the feedstock can be from about 500 to 20,000 SCF/bbl, preferably between about 2,000 and 10,000 SCF/bbl.

Although presulfiding is not required, the hydrocracking catalyst is more active and selective if it is sulfided prior to use. Presulfiding can be accomplished by treating the catalyst with a mixture of, e.g., about 10 mole percent H$_2$S in hydrogen while the temperature is increased from about 20° C. to various temperatures up to about 400° C. until H$_2$S appears in the effluent gas. An increase in temperature of from about 25° C. to about 315° C. is preferred.

The following examples illustrate the effect that the method of catalyst preparation has on hydrocracking activity.

EXAMPLE I (Preparation of Catalysts A, B, and C)

Catalyst A was prepared by adding 46.7 g of powdered TiO$_2$ (rutile) to 110 mL of aqueous solution that contained 4.33 g (NH$_4$)$_6$Mo$_7$O$_{24}$.4H$_2$O. After thorough mixing, the water was removed by evaporation and the product calcined in air at about 538° C. for two hours. After cooling, the solid was crushed, then slurried into 50 mL of aqueous solution that contained 4.64 g of Ni(NO$_3$)$_2$.6H$_2$O. After mixing, the water was removed by evaporation and the product again calcined in air for two hours at 538° C. The calcined material weighed 48.4 g. Half of it was ground together with 17.79 g of Linde 33-200 zeolite, a low-sodium, hydrogen type Y zeolite; the mixture was moistened with 30 mL water, dried, and calcined in air for two hours at 538° C. A −20+35 mesh fraction was obtained for testing. The composition of the Ti-Ni-Mo portion of the catalyst was 2.3% NiO, 6.9% MoO$_3$, and 90.8% TiO$_2$. The finished catalyst contained 57.6% of this admixed with 42.4% of the zeolite.

Catalyst B had the identical composition of Catalyst A and was prepared using the same steps that were used to make A, but differed in that nickel was impregnated onto TiO$_2$ and calcined before molybdenum was.

Catalyst C differed from A and B in that the TiO$_2$ was replaced with Al$_2$O$_3$. Its preparation started by adding 41.0 g powdered Catapal alumina to 30 mL of aqueus solution in which 3.8 g of (NH$_4$)$_6$Mo$_7$O$_{24}$.4H$_2$O was dissolved. After mixing, the water was removed by evaporation and the residue calcined in air for two hours at 538° C. This material was crushed, then slurried with an aqueous solution containing 4.07 g Ni(NO$_3$)$_2$.6H$_2$O. After drying, it was again calcined in air for two hours at 538° C. The calcined material weighed 37.0 g. Half of it was ground with 13.6 g of Linde 33-200 zeolite, moistened with water, dried and again calcined in air for two hours at 538° C. A −20+35 mesh fraction of this product was obtained for testing. The composition of the Al-Ni-Mo portion of the catalyst was 2.3% NiO, 6.9% MoO$_3$, and 90.8% Al$_2$O$_3$. The finished catalyst contained 57.6% of this admixed with 42.4% of the zeolite.

EXAMPLE II

Hydrocracking runs were made with catalysts A, B, and C according to the following procedure: 9.75 g portions of −20+35 mesh catalyst were diluted with a sufficient volume of alpha alumina of the same mesh size to yield 25 mL. Each was placed in a ¾-in. pipe reactor 16″ long and mounted vertically in an electrically heated furnace. The catalysts were presulfided as follows: After heating to 205° C. in hydrogen only, they were treated for two hours at that temperature with 10% H$_2$S in hydrogen. H$_2$S was removed from the gas while the temperature was increased to 371° C. during one hour. Then they were treated for two more hours at that temperature with the same H$_2$S/H$_2$ mixture. H$_2$S was removed from the feed and, after the reactor had been purged with hydrogen, the run was started. Liquid feed was pumped from a calibrated burette and hydrogen was metered through a dP cell. Runs were made at 7.0 MPa (1000 psig) with hydrocarbon feed being pumped at 25 mL/hr and hydrogen flowing at 30 L/hr. In each instance the catalyst was used at run conditions for about 28 hours before product collection was begun. Hydrocarbon feed to the reactor was a straight run distillate that is characterized in Table I.

TABLE I

| | |
|---|---|
| Spec. gravity | 0.8448 |
| Mol. wt. | 193.7 |
| Nitrogen | 0.0104 wt. % |
| Sulfur | 0.66 wt. % |
| Simulated Distillation Analysis, By Gas Chromatography | |
| Initial Boiling Point | 209.9° F. |
| 1% | 269.6 |
| 5 | 333.1 |
| 10 | 387.7 |
| 30 | 438.6 |
| 50 | 489.2 |
| 70 | 538.1 |
| 90 | 604.5 |
| 95 | 627.9 |
| 99 | 675.7 |
| Final Boiling Point | 769.6 |
| Initial Boiling Point to 400° F. | 13.99 wt. % |
| 400—500° F. | 41.43 wt. % |
| 500° F.+ | 44.58 wt. % |

Liquid reaction product was collected in a receiver at the pressure of the process. An 8-hour sample was obtained from daytime operations and a 16-hour sample from nighttime. Product not condensible at ambient temperature was vented via a back pressure regulator. Liquid samples were analyzed for nitrogen and sulfur, and for volatility by simulated distillation by gas chromatography. Results from Catalysts A, B, and C are tabulated in Tables II, III, and IV, respectively. Blanks in the Tables indicate that the analysis was not made. Conversion of 400° F.+ fraction is calculated from $$\% \text{ Conversion} = \frac{\text{conc. of } 400° \text{ F.+ in feed} - \text{conc of } 400° \text{ F.+ in product}}{\text{conc. of } 400° \text{ F.+ in feed}}$$

The activities of Catalysts A, B, and C for hydrocracking are tabulated in Table II. Inventive Catalyst B exhibited the greatest activity for hydrocracking and its activity declined at the lowest rate. Catalyst A, having identical composition as B but prepared in a different manner, had less activity and its activity fell at a greater rate. For comparison, Catalyst C, which is exemplary of some currently used hydrocracking catalysts, exhibited lower activity than either Catalysts A or B when all were used at identical conditions and with the same feed.

TABLE II

| Sample | Interval, (hrs.) | Temp., (°F.) | Sulfur, (wt. %) | Nitrogen ppm | Conversion of 400° F.+ fraction |
|---|---|---|---|---|---|
| Catalyst A | | | | | |
| Sample $A_1$ | 0—8 | 716 | 0.005 | 2 | 97.2 |
| Sample $A_2$ | 8—23 | 719 | 0.005 | 2 | 95.4 |
| Sample $A_3$ | 23—32 | 714 | 0 008 | 2 | 94.1 |
| Sample $A_4$ | 32—47 | 715 | 0.005 | 2 | 92.7 |
| Catalyst B | | | | | |
| (Invention catalyst) | | | | | |
| Sample $B_1$ | 0—5 | 715 | — | — | 98.3 |
| Sample $B_2$ | 5—21 | 714 | — | — | 97.1 |
| Sample $B_3$ | 21—29 | 715 | — | — | 96.4 |
| Sample $B_4$ | 29—46 | 716 | — | — | 96.7 |
| Sample $B_5$ | 46—54 | 715 | — | — | 96.6 |
| Sample $B_6$ | 54—69 | 716 | — | — | 95.8 |
| Sample $B_7$ | 69—78 | 715 | 0.012 | N.D.* | 95.4 |
| Sample $B_8$ | 78—93 | 716 | 0.005 | N.D.* | 94.7 |
| Catalyst C | | | | | |
| Sample $C_1$ | 0—7 | 715 | 0.007 | N.D.* | 93.2 |
| Sample $C_2$ | 7—23 | 715 | 0.005 | N.D.* | 91.6 |
| Sample $C_3$ | 23—31 | 715 | — | — | 90.9 |
| Sample $C_4$ | 31—47 | 714 | — | — | 89.2 |
| Sample $C_5$ | 47—55 | 714 | — | — | 88.9 |
| Sample $C_6$ | 55—71 | 714 | — | — | 85.8 |

*None detected.

Reasonable variations, such as those which would occur to a skilled artisan, are within the scope of the invention.

We claim:

1. A process of producing a hydrocracking catalyst having a high activity and a slow deactivation rate comprising the steps of:
   (1) contacting a Group IVB metal oxide with at least one Group VIII metal-containing substance,
   (2) contacting the product of step (1) with at least one Group VIB metal-containing substance,
   (3) combining the product of step (2) with an acidic cracking catalyst component containing a zeolite, and
   (4) recovering the product of step (3).

2. The process of claim 1 wherein the Group IVB metal oxide is titanium dioxide.

3. The process of claim 1 wherein the Group VIII metal is selected from the group consisting of nickel, cobalt, and combinations thereof.

4. The process of claim 1 wherein the Group VIB metal is selected from the group consisting of molybdenum, tungsten, and combinations thereof.

5. The process of claim 1 wherein the Group IVB metal oxide is titanium dioxide, the Group VIII metal is nickel, and the Group VIB metal is molydbenum.

6. The process of claim 1 wherein the Group VIII metal-containing substance is nickel nitrate, and the Group VIB metal-containing substance is ammonium molybdate.

7. The process of claim 1 wherein the product of step (1) is dried and calcined prior to step (2).

8. The process of claim 7 wherein the product of step (3) is dried and calcined.

9. The process of claim 1 wherein said recovered product is prepared by using the following amounts:
   (a) about 10-90 weight percent of said acidic cracking catalyst component,
   (b) about 0.5-15 weight percent of Group VIII metal in said Group VIII metal-containing substance,
   (c) about 1-35 weight percent of Group VIB metal in said Group VIB metal-containing substance, and
   (d) about 10-80 weight percent of said Group IVB metal oxide;
wherein said weight percentages are based upon the total weight of said acidic cracking catalyst component, said Group VIII metal, said Group VIB metal and said Group IVB metal oxide.

10. The process of claim 1 wherein said recovered product is prepared by using the following amounts:
   (a) about 25-75 weight percent of said acidic cracking catalyst component,
   (b) about 1-10 weight percent of Group VIII metal in said Group VIII metal-containing substance,
   (c) about 2-30 weight percent of Group VIB metal in said Group VIB metal-containing substance, and
   (d) about 25-75 weight percent of said Group IVB metal oxide;
wherein said weight percentages are based upon the total weight of said acidic cracking catalyst component, said Group VIII metal, said Group VIB metal and said Group IVB metal oxide.

11. The catalyst produced by the process of claim 1.
12. The catalyst produced by the process of claim 2.
13. The catalyst produced by the process of claim 3.
14. The catalyst produced by the process of claim 4.
15. The catalyst produced by the process of claim 5.
16. The catalyst produced by the process of claim 6.
17. The catalyst produced by the process of claim 7.
18. The catalyst produced by the process of claim 8.
19. The catalyst produced by the process of claim 9.
20. The catalyst produced by the process of claim 10.
21. A process for producing a catalyst comprising the steps of:

(1) contacting a Group IVB metal oxide with at least one Group VIII metal-containing substance,
(2) calcining the product of step (1) at a temperature not exceeding about 700° C.,
(3) contacting the product of step (2) with at least one Group VIB metal-containing substance,
(4) combining the product of step (3) with an acidic cracking catalyst component containing a zeolite, and
(5) recovering the product of step (4).

22. A process according to claim 21 wherein the temperature of step (2) is about 450° to about 700° C.

23. A process according to claim 22 wherein said Group IVB metal oxide is titanium dioxide and said Group VII metal-containing substance is a nickel- or cobalt-containing substance.

24. A process according to claim 21 wherein the temperature of step (2) does not exceed about 600° C.

25. A process according to claim 21 wherein the temperature of step (2) is about 540° to about 600° C.

26. A process according to claim 25 wherein said Group IV B metal oxide is titanium dioxide and said Group III metal-containing substance is a nickel- or cobalt-containing substance.

27. A process according to claim 22 wherein the product of step (3) is calcined at a temperature of about 450° to about 700° C.

28. A process according to claim 27 wherein the product of step (4) is calcined at a temperature of about 450° to about 700° C.

29. The process of claim 21 wherein said recovered product is prepared by using the following amounts:
(a) about 10–90 weight percent of said acidic cracking catalyst component,
(b) about 0.5–15 weight percent of Group VIII metal in said Group VIII metal-containing substance,
(c) about 1–35 weight percent of Group VI B metal in said Group VI B metal-containing substance, and
(d) about 10–80 weight percent of said Group IV B metal oxide;
wherein said weight percentages are based upon the total weight of said acidic cracking catalyst component, said Group VIII metal, said Group VI B metal and said Group IV B metal oxide.

30. The process of claim 22 wherein said recovered product is prepared by using the following amounts:
(a) about 25–75 weight percent of said acidic cracking catalyst component,
(b) about 1–10 weight percent of Group VIII metal in said Group VIII metal-containing substance,
(c) about 2–30 weight percent of Group VI B metal in said Group VI B metal-containing substance, and
(d) about 25–75 weight percent of said Group IV B metal oxide;
wherein said weight percentages are based upon the total weight of said acidic cracking catalyst component, said Group VIII metal, said Group VI B metal and said Group IV B metal oxide.

31. The catalyst prepared by
(1) impregnating titanium dioxide with a nickel-containing substance,
(2) calcining the product of step (1) at a temperature at a temperature of about 475° to about 700° C.,
(3) contacting the product of step (2) with a molybdenum-containing substance, and
(4) combining the product of step (3) with a zeolite;
wherein said catalyst is prepared by using the following amounts: prepared by using the following amounts:
(a) about 10–90 weight percent of said zeolite,
(b) about 0.5–15 weight percent of nickel in said nickel-containing substance,
(c) about 1–35 weight percent of molybdenum in said molybdenum-containing substances, and
(d) about 10–80 weight percent of said titanium dioxides;
wherein said weight percentages are based upon the total weight of said zeolite, said nickel, said molybdenum and said titanium dioxide.

32. A catalyst according to claim 31 wherein the temperature of step (2) does not exceet about 600° C.

33. A catalyst according to claim 31 wherein said nickel-containing substance is nickel nitrate and said molybdenum-containing substance is ammonium heptamolybdate.

34. A catalyst according to claim 31 wherein the product of step (3) is calcined at a temperature of about 475° to about 700° C. prior to step (4).

35. A catalyst according to claim 34 wherein the product of step (3) is combined with said zeolite by grinding them together to produce a mixture, moistening said mixture with water, and calcining said mixture in air, is dried and calcined.

36. A catalyst according to claim 35 wherein said catalyst is prepared by using the following amounts:
(a) about 25–75 weight percent of said zeolite,
(b) about 1–10 weight percent of nickel in said nickel-containing substance,
(c) about 2–30 weight percent of molybdenum in said molybdenum-containing substances, and
(d) about 25–75 weight percent of said titanium dioxide
wherein said weight percentages are based upon the total weight of said zeolite, said nickel, said molybdenum and said titanium dioxide.

* * * * *